United States Patent
Xu et al.

(10) Patent No.: US 11,186,663 B2
(45) Date of Patent: Nov. 30, 2021

(54) HIGH FILLER LOADED COMPOSITIONS WITH HIGH MELT FLOW POLYOLEFINS

(71) Applicant: ExxonMobil Chemical Patents Inc., Baytown, TX (US)

(72) Inventors: Jie Hui Xu, Shanghai (CN); Na Li, Shanghai (CN)

(73) Assignee: ExxonMobil Chemical Patents Inc., Baytown, TX (US)

(*) Notice: Subject to any disclaimer, the term of this patent is extended or adjusted under 35 U.S.C. 154(b) by 186 days.

(21) Appl. No.: 15/684,138

(22) Filed: Aug. 23, 2017

(65) Prior Publication Data
US 2018/0105624 A1   Apr. 19, 2018

Related U.S. Application Data

(60) Provisional application No. 62/410,101, filed on Oct. 19, 2016.

(51) Int. Cl.

| | | |
|---|---|---|
| C08L 23/14 | (2006.01) | |
| C08K 3/26 | (2006.01) | |
| C08F 210/06 | (2006.01) | |
| C08F 210/16 | (2006.01) | |
| C08F 10/14 | (2006.01) | |
| C08L 23/08 | (2006.01) | |
| C08L 23/12 | (2006.01) | |
| G01N 25/48 | (2006.01) | |
| C08K 3/04 | (2006.01) | |
| E04D 5/06 | (2006.01) | |
| C08L 9/00 | (2006.01) | |
| C01B 13/14 | (2006.01) | |
| C01F 7/02 | (2006.01) | |
| C08K 3/22 | (2006.01) | |
| C08K 5/14 | (2006.01) | |

(52) U.S. Cl.
CPC ............ *C08F 210/06* (2013.01); *C08F 10/14* (2013.01); *C08F 210/16* (2013.01); *C08K 3/26* (2013.01); *C08L 23/08* (2013.01); *C08L 23/12* (2013.01); *C08L 23/14* (2013.01); *C01B 13/14* (2013.01); *C01F 7/02* (2013.01); *C08K 3/04* (2013.01); *C08K 3/22* (2013.01); *C08K 5/14* (2013.01); *C08K 2003/2265* (2013.01); *C08K 2003/265* (2013.01); *C08L 9/00* (2013.01); *C08L 2205/025* (2013.01); *E04D 5/06* (2013.01); *G01N 25/4866* (2013.01)

(58) Field of Classification Search
CPC ................................................ C08K 2003/265
See application file for complete search history.

(56) References Cited

U.S. PATENT DOCUMENTS

| | | | |
|---|---|---|---|
| 7,008,699 B2 * | 3/2006 | Jourdian | ................. B32B 27/32 |
| | | | 428/517 |
| 7,335,696 B2 | 2/2008 | Yalvac et al. | |
| 7,737,206 B2 | 6/2010 | Ouhadi et al. | |
| 9,464,181 B2 * | 10/2016 | Tong | ................... C08L 23/0815 |
| 2015/0038637 A1 * | 2/2015 | Tong | ................... C08L 23/0815 |
| | | | 524/528 |

\* cited by examiner

*Primary Examiner* — Vickey Nerangis

(57) ABSTRACT

This disclosure relates to a composition comprising (a) a blend; (b) one or more fillers comprising at least one of carbon black, ferrite magnet powder, calcium carbonate, alumina trihydrate, magnesium hydroxide, talc, titanium dioxide, fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, chalk, or any combination thereof. The cross-linking agents comprise organic peroxide, and the coagents comprise at least one of di- and tri-allyl cyanurates and isocyanurates, liquid and metallic multifunctional acrylates and methacrylates, zinc-based dimethacrylates and diacrylates, and functionalized polybutadiene resins and optionally (c) a cross-linking pack including cross-linking agents and coagents.

19 Claims, No Drawings

HIGH FILLER LOADED COMPOSITIONS WITH HIGH MELT FLOW POLYOLEFINS

PRIORITY CLAIM

This application claims priority to and benefit of U.S. Ser. No. 62/410,101, filed Oct. 19, 2016 and is incorporated by reference in its entirety.

FIELD OF THE INVENTION

The present invention relates to compositions and, in particular to thermoplastic compositions with fillers highly incorporated, comprising (a) high melt flow/low viscosity propylene-based polymer and (b) one or more fillers.

BACKGROUND OF THE INVENTION

Highly filled polymer compositions are used extensively in commercial applications, such as flame retardant (FR) and halogen-free flame retardant (HFFR) applications; sound management applications; flooring applications; wire and cable applications; roofing membrane applications; wall covering applications; magnetic sheet/strip applications; carpet backing; containers and automotive applications. Likewise, such highly filled polymer compositions can be used as master batch with filler highly loaded.

High melt flow rate polyolefins, such as polypropylene and polyethylene homo- and copolymers, are used in this field with the limitation of low levels of filler incorporated, poor processability, and poor mechanical properties. The homogeneity of such very high melt flow rate polyolefins incorporated with high amount of filler is generally low.

U.S. Pat. No. 7,737,206 discloses a composition consisting essentially of a propylene copolymer, a filler, a homopolypropylene and a synthetic or natural rubber. U.S. Pat. No. 7,335,696 discloses a composition comprising ethylene/alpha-olefin copolymer and fillers loaded in an amount of greater than 40 percent by weight of the polymer composition.

There is, therefore, a need for a novel polymer composition suitable for the fabrication of finished articles and/or as a pigment/filler masterbatch. It would be desirable to utilize very high levels of filler for these applications, typically at least 15 wt %, preferably at least 30 wt %, more preferably at least 35 wt %, even more preferably at least 40 wt %, and if achievable, at least 55 wt % and up to 95 wt % filler, while still maintaining the balance of performance properties, such as flexibility, tensile strength, impact strength, extensibility, elongation, heat resistance, low temperature flexibility, thermoformability and thermostability during processing, and excellent dispersion performance of fillers incorporated therein, necessary to effectively fabricate the filled polymer compositions into fabricated articles.

U.S. Patent Publication No. 2015/0038637 discloses a polymer composition with a first polymer (including a propylene-based copolymer with a melt flow rate of 0.5 to 1,000 g/10 min and an ethylene/$C_3$-$C_{10}$ alpha-olefin copolymer), one or more fillers, and optionally a cross-linking pack. However, the processability of such compositions is challenging due to the low melt flow rate/high viscosity of the first polymer. Conventionally, processing aids such as oils or waxes have been added to lower the viscosity of high filler loading compounds. However, such processing aids tend to migrate to the surface of the end-use products, thereby affecting the appearance and post-fabrication treatment process.

What is desired is a high melt flow/low viscosity polymer suitable for use in a high filler loading compound, exhibiting a balance of physical and mechanical properties for the applications of interest.

SUMMARY OF THE INVENTION

In some embodiments, this disclosure relates to a composition comprising a blend of (a) a first propylene-based polymer, wherein the first propylene-based polymer is a homopolymer of propylene or a copolymer of propylene and ethylene or a C4 to C10 alpha-olefin; and (b) a second propylene-based polymer, wherein the second propylene-based polymer is a homopolymer of propylene or a copolymer of propylene and ethylene or a C4 to C10 alpha-olefin; wherein the second propylene-based polymer is different than the first propylene-based polymer; one or more fillers comprising i) carbon black, in an amount of from greater than 40 wt % to less than or equal to 65 wt % based on the total weight of the polymer composition; or ii) ferrite magnet powder, in an amount of less than or equal to 90 wt % based on the total weight of the polymer composition; or iii) calcium carbonate, in an amount of from greater than 75 wt % to less than or equal to 90 wt % based on the total weight of the polymer composition; or iv) alumina trihydrate, magnesium hydroxide, talc, titanium dioxide, natural fibers, polymeric fibers, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, mica, wollastonite, chalk, graphite, pigments, or any combination thereof, in an amount of from greater than 40 wt % to less than or equal to 90 wt % based on the total weight of the polymer composition; and wherein the cross-linking pack comprises a cross-linking agent in an amount of from 0.1 to 5 parts by weight and a coagent in an amount of from 0.1 to 10 parts by weight, based on 100 parts by weight of the first polymer; the cross-linking agent comprises an organic peroxide and the coagent comprises at least one of di- and tri-allyl cyanurates and isocyanurates, liquid and metallic multifunctional acrylates and methacrylates, zinc-based dimethacrylates and diacrylates, and functionalized polybutadiene resins; and optionally a cross-linking pack; wherein the blend has a melt viscosity of about 1,000 cP to about 20,000 cP, a melting point, as determined by DSC, of about 130° C. or less, and a melt flow rate greater than about 1,000 g/10 min measured at 230° C. and 2.16 kg weight.

In yet other embodiments, this disclosure relates to a thermoplastic blend comprising (i) the composition of this disclosure in an amount of from greater than 2 wt % to less than or equal to 40 wt % of the blend composition; and (ii) a third polymer present in an amount of from greater than or equal to 60 wt % to less than 98 wt % based on the total weight of the blend composition, wherein the third polymer includes a polypropylene having a melting point greater than or equal to 110° C.

In other embodiments, the composition and/or the thermoplastic blend of this disclosure have applications as roofing material, wire and cable insulation or jacket, magnetic strip, carpet backing, container, film, sheet, filament, or sound deadening material.

DETAILED DESCRIPTION OF THE INVENTION

Various specific embodiments, versions of the invention will now be described, including preferred embodiments and definitions that are adopted herein. While the following detailed description gives specific preferred embodiments, those skilled in the art will appreciate that these embodiments are exemplary only, and that the invention can be practiced in other ways.

In some embodiments, this disclosure relates to a polymer composition comprising a first polymer, one or more fillers and optionally a cross-linking pack. The polymer composition of this disclosure provides enhanced balance of mechanical and physical properties, particularly, good dispersion performance of fillers incorporated.

The amount of the first polymer in the polymer composition varies from the end-use applications and the desired end-properties of the polymer composition. Not intended to be limited by any theory, it is believed that the first polymer in this disclosure serves as a binder and also provides enhanced physical properties, e.g., flexibility, tensile strength, dispersion performance etc., of the polymer composition. In some embodiments, the amount of the first polymer in the polymer composition of this disclosure is greater than about 5 wt %, greater than 10 wt %, greater than 15 wt %, greater than 20 wt %, or greater than 35 wt %, based on the total weight of the polymer composition. In other embodiments, the amount of the first polymer in the polymer composition of this disclosure is less than about 60 wt %, less than 50 wt %, less than 45 wt %, less than about 40 wt %, or less than 20 wt %, by the total weight of the polymer composition.

The amount of filler in the polymer composition varies from the type of the fillers and the desired end-use applications of the polymer composition. In some embodiments, the amount of the fillers incorporated into the polymer composition is less than about 95 wt %, less than 90 wt %, less than 85 wt %, less than 80 wt %, or less than 65 wt %, by the total weight of the polymer composition. In other embodiments, the minimum amount of the filler is greater than about 40 wt %, preferably greater than about 50 wt %, more preferably greater than about 55 wt %, even more preferably greater than 60 wt %, and most preferably greater than about 80 wt %, by the total weight of the polymer composition.

Polymer Blend

In one embodiment, the polymer blend, also referred to herein as "blend" is preferably a semi-crystalline propylene-based polymer. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "polymer blend" as used herein includes, but is not limited to a blend of one or more polymers prepared in solution or by physical blending, such as melt blending.

"Propylene-based" or "predominantly propylene-based" as used herein, is meant to include any polymer comprising propylene, either alone or in combination with one or more comonomers, in which propylene is the major component (i.e., greater than 50 mol % propylene).

In any embodiment, one or more polymers of the blend may comprise one or more propylene-based polymers, which comprise propylene and from about 2 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more propylene-based polymers of the first polymer may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers of the propylene-based polymer may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers of the propylene-based polymer may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 125° C., less than about 120° C., or less than about 115° C., or less than about 110° C., or less than about 100° C., or less than about 90° C., and greater than about 70° C., or greater than about 75° C., or greater than about 80° C., or greater than about 85° C. In any embodiment, the Tm of the one or more polymers of the blend may be greater than about 25° C., or greater than about 30° C., or greater than about 35° C., or greater than about 40° C. Tm of the first polymer can be determined by taking 5 to 10 mg of a sample of the first polymer, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., ramping the temperature at a rate of 10° C. per minute up to 200° C., maintaining the temperature for 5 minutes, and recording the temperature as Tm.

In one or more embodiments, the crystallization temperature (Tc) of the first polymer (as determined by DSC) is less than about 110° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc of the polymer is greater than about 0° C., or greater than about 5° C., or greater than about 10° C., or greater than about 15° C., or greater than about 20° C. In any embodiment, the Tc lower limit of the polymer may be 0° C., 5° C., 10° C., 20° C., 30° C., 40° C., 50° C., 60° C., and 70° C.; and the Tc upper limit temperature may be 100° C., 90° C., 80° C., 70° C., 60° C., 50° C., 40° C., 30° C., 25° C., and 20° C. with ranges from any lower limit to any upper limit being contemplated. Tc of the first polymer can be determined by taking 5 to 10 mg of a sample of the first polymer, equilibrating a DSC Standard Cell FC at −90° C., ramping the temperature at a rate of 5-10° C. per minute up to 200° C., maintaining the temperature for 5 minutes, lowering the temperature at a rate of 5-10° C. per minute to −90° C., and recording the temperature as Tc.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotactic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer can have a level of isotacticity expressed as percentage of isotactic triads (three consecutive propylene units), as measured by $^{13}$C NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Pat. No. 7,232,871.

The semi-crystalline polymer may have a tacticity index m/r ranging from a lower limit of 4, or 6 to an upper limit of 10, or 20, or 25. The tacticity index, expressed herein as "m/r", is determined by $^{13}$C nuclear magnetic resonance ("NMR"). The tacticity index m/r is calculated as defined by H. N. Cheng in 17 MACROMOLECULES, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D-792.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_o c/\Delta R(\theta,c)]=[1/MP(\theta)]+2A_2 c$$

where $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_O$ is the optical constant for the system:

$$K_O = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_W$, is defined as the sum of the products of the molecular weight $M_i$ of each fraction multiplied by its weight fraction $w_i$:

$$M_w \equiv \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i.$$

The number-average molecular weight, $M_n$, is defined as the sum of the products of the molecular weight $M_i$ of each fraction multiplied by its mole fraction $x_i$:

$$M_n \equiv \Sigma x_i M_i = \Sigma N_i M_i / \Sigma N_i$$

since the mole fraction $x_i$ is defined as $N_i$ divided by the total number of molecules $$x_i = N_i / \Sigma N_i.$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v \equiv (\Sigma c_i M_i^\alpha / \Sigma c_i)^{1/\alpha}.$$

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated. In an embodiment, the first polymer has a Melt Flow Rate ("MFR", 230° C./2.16 kg) within the range of from about 1,000 or 2,000 g/10 min to about 5,000 or 10,000 g/10 min.

The first polymer that may be used in the high filler loading compounds disclosed herein generally includes any of the polymers according to the process disclosed in WO Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences. Such polymers made in accordance with WO Publication No. 2013/134038, when subjected to Temperature Rising Elution Fractionation, exhibit: a first fraction that is soluble at −15° C. in xylene, the first fraction having an isotactic (mm) triad tacticity of about 70 mol % to about 90 mol %; and a second fraction that is insoluble at −15° C. in xylene, the second fraction having an isotactic (mm) triad tacticity of about 85 mol % to about 98 mol %. The contents of WO Publication No. 2013/134038 is incorporated herein in its entirety.

Polymers and blended polymer products are also provided. In any embodiment, one or more of the polymers described herein may be blended with another polymer, such as another polymer described herein, to produce a physical blend of polymers.

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula $(In^1)Y(In^2)MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylphenyl) indenyl) zirconium dimethyl, (dimethylsilyl)bis(2-methyl-4-(3,'5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f) indenyl) zirconium dichloride, and cyclopropylsilyl bis(2-(methyl)-5,5,8,8-tetramethyl-5,6,7,8-tetrahydrobenz(f) indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a $-(CH_2)_a-$ group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

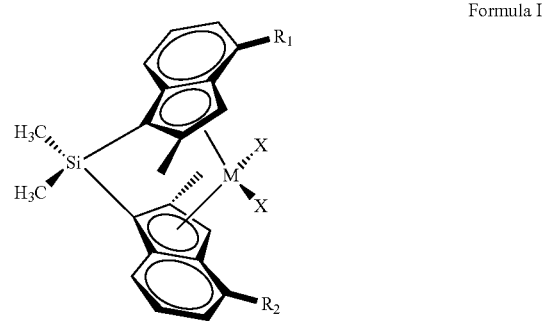

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalyst. A particularly advantageous activator is dimethylaniliniumtetrakis(heptafluoronaphthyl) borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x—Al—O)_n$, which is a cyclic compound, or $R^x(R^x—Al—O)_nAlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

WO Publication No. 2013/134038, incorporated herein by reference, generally describes the catalysts, activators, and solvents used to prepare the blend.

Filler

The fillers of this disclosure may be either solid inorganic fillers and/or solid organic fillers. The term "filler" encompasses both pigments and additives such as, for instance, flame retardants. The term "solid" as used herein means that a material is solid at temperatures of up to about 40° C.

Representative organic fillers include such materials as cellulose, starch, organic pigments such as color concentrates, organic UV-stabilizers, organic heat-stabilizers, organic flame retardants such as halogenated, for instance, bromine containing flame retardants, flour, wood flour, natural fibers, and polymeric fibers like polyester-based, polyamide-based materials, ammonium octamolybdate and intumescent compounds.

Inorganic fillers are the preferred fillers for use in this disclosure. Preferred examples of inorganic fillers are talc, graphite, calcium carbonate, glass fibers, marble dust, cement dust, clay, feldspar, silica or glass, fumed silica, alumina, magnesium oxide, antimony oxide, zinc oxide, barium sulfate, silicones calcium sulfate, aluminum silicate, calcium silicate, titanium dioxide, titanates, clay, nanoclay, organo-modified clay or nanoclay, glass microspheres, mica, wollastonite, inorganic pigments, and chalk. Of these fillers, barium sulfate, talc, calcium carbonate, silica/glass, glass fibers, alumina, aluminum trihydroxide, magnesium hydroxide and titanium dioxide, and mixtures thereof are preferred. The most preferred inorganic fillers are talc, magnesium hydroxide, aluminum trihydroxide, calcium carbonate, barium sulfate, glass fibers or mixtures thereof. For flame resistance applications, the preferred flame-retardant fillers include magnesium hydroxide, aluminum trihydroxide (also referred to as alumina trihydrate) and mixtures of two or more of these materials, red amorphous phosphorous, polyphosphates, alkyl phosphates, alkyl phosphonates, amine phosphates, aminoalkyl phosphates, ammonium phosphates, ammonium polyphosphates, antimony oxide, and zinc borates.

In some embodiments of this disclosure, the amount of filler present in the polymer composition is at least about 40 wt %, at least about 42 wt %, at least 50 wt %, at least about 52 wt %, at least about 60 wt %, at least about 82 wt % or at least about 89 wt %, based on the total amount of the polymer composition and depending on the type of filler used and the end use applications. In particular, the minimum amount of calcium carbonate according to the present disclosure is about 40 wt %, 60 wt %, 70 wt %, 75 wt %, 78 wt %, 80 wt %, 82 wt %, or 85 wt %, based on the total amount of the polymer composition. The minimum amount of carbon black according to the present disclosure is about 30 wt %, 40 wt %, 45 wt %, 48 wt %, 50 wt %, or 51 wt %, based on the total amount of the polymer composition. The minimum amount of titanium dioxide according to the present disclosure is about 40 wt %, 50 wt %, 55 wt %, 60 wt %, 65 wt %, 70 wt %, or 75 wt %, based on the total amount of the polymer composition. The minimum amount of magnet ferrite powder according to the present disclosure is about 40 wt %, 50 wt %, 60 wt %, 65 wt %, 68 wt %, or 70 wt %, based on the total amount of the polymer composition. The minimum amount of aluminum trihydroxide or magnesium hydroxide according to the present disclosure is about 40 wt %, 50 wt %, 55 wt %, 58 wt %, 60 wt %, or 61 wt %, based on the total amount of the polymer composition.

The maximum amount of filler incorporated in the polymer composition while maintaining the balanced mechanical and physical properties, including tensile strength, flexibility, elongation, dispersion performance, etc., varies from the desired end-use and depends on the type of fillers incorporated into the polymer composition. In particular, the maximum amount of calcium carbonate according to the present disclosure is 95 wt %, 92.5 wt %, 90 wt %, 88 wt %, 86 wt %, 85 wt %, or 84 wt %, based on the total amount of the polymer composition. The maximum amount of carbon black according to the present disclosure is about 65 wt %, 62.5 wt %, 61 wt %, or 60 wt %, based on the total amount of the polymer composition. The maximum amount of titanium dioxide according to the present disclosure is about 90 wt %, 88 wt %, 85 wt %, 83 wt %, 82 wt %, 81 wt %, 80 wt %, or 78 wt %, based on the total amount of the polymer composition. The maximum amount of magnet ferrite powder according to the present disclosure is about 95 wt %, 94 wt %, 93 wt %, 92 wt %, 91 wt %, 90 wt %, or 89 wt %, based on the total amount of the polymer composition. The maximum amount of aluminum trihydroxide or magnesium hydroxide according to the present disclosure is about 90 wt %, 88 wt %, 85 wt %, 83 wt %, 82 wt %, 81 wt %, 80 wt %, or 78 wt %, based on the total amount of the polymer composition.

For some applications the use of two or more fillers is preferred. Examples of useful filler blends include any combination of carbon black, ferrite magnet powder, calcium carbonate, alumina trihydrate, magnesium hydroxide, talc, titanium dioxide, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, and chalk; for example, barium sulfate and calcium carbonate for sound barriers, carbon black and calcium carbonate and/or talc for conductive flooring, magnet powder and calcium carbonate and/or talc for magnetic strip/sheet. The amount of filler blend present in the polymer composition is at least about 5 wt %, at least about 10 wt %, at least about 20 wt %, at least about 30 wt %, at least about 40 wt %, at least about 41 wt %, at least about 42 wt %, at least 50 wt %, at least about 52 wt %, at least about 60 wt %, at least about 82 wt % and at least about 89 wt %, based on the total amount of the polymer composition and depending on the type of filler used and the end use applications. The amount of filler blend present in the polymer composition is less than about 95 wt %, less than about 90 wt %, less than about 85 wt %, less than about 80 wt %, less than about 75 wt %, or less than about 60 wt %, based on the total amount of the polymer composition and depending on the type of filler used and the end use applications.

In particular, when carbon black is mixed with one or more of calcium carbonate, ferrite magnet powder, alumina trihydrate, magnesium hydroxide, talc, titanium dioxide, glass fibers, natural fibers, polymeric fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, mica, wallastonite, chalk, graphite and pigments, the minimum total content of the two or more fillers based on the total weight of the polymer composition is 51 wt %, 55 wt %, 60 wt %, 65 wt %, 70 wt %, 75 wt %, 80 wt %, 85 wt %, or 90 wt %; and the maximum total content of fillers based on the total weight of the polymer composition is 99 wt %, 95 wt %, 90 wt %, 86 wt %, 81 wt %, 76 wt %, 71 wt %, 66 wt %, 61 wt %, 56 wt %, or 51 wt %, so long as the minimum total amount is less than or equal to the maximum total amount. When ferrite magnet powder is mixed with one or more of calcium carbonate, carbon black, alumina trihydrate, magnesium hydroxide, talc, titanium dioxide, glass fibers, natural fibers, polymeric fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, mica, wallastonite, chalk, graphite and pigments, the minimum total content of the two or more fillers based on the total weight of the polymer composition is 10 wt %, 20 wt %, 30 wt %, 40 wt %, 50 wt %, 60 wt %, 70 wt %, 80 wt %, or 90 wt %; and the maximum total content of fillers based on the total weight of the polymer composition is 99 wt %, 95 wt %, 90 wt %, 81 wt %, 71 wt %, 61 wt %, 51 wt %, 41 wt %, 31 wt %, or 21 wt %, so long as the minimum total amount is less than or equal to the maximum total amount. When calcium carbonate is mixed with one or more of ferrite magnet powder, carbon black, alumina trihydrate, magnesium hydroxide, talc, titanium dioxide, glass fibers, natural fibers, polymeric fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, mica, wallastonite, chalk, graphite and pigments, the minimum total content of the two or more fillers based on the total weight of the polymer composition is 81 wt %, 82 wt %, 83 wt %, 85 wt %, 88 wt %, 90 wt %, 93 wt %, or 95 wt %; and the maximum total content of fillers based on the total weight of the polymer composition is 99 wt %, 95 wt %, 90 wt %, 89 wt %, 86 wt %, 84 wt %, 83 wt %, or 82 wt %, so long as the minimum total amount is less than or equal to the maximum total amount.

Cross-Linking Pack

Optionally, in some embodiments, the polymer composition of this disclosure further comprises a cross-linking pack including a cross-linking agent and a coagent. Not intended to be limited by any theory, it is believed that the addition of cross-linking agents may create cross links between the plastic and rubber phases, which improves the physical properties of the innovated crosslinked polymer composition of this disclosure. Suitable cross-linking agents are organic peroxides including both alkyl and aralkyl peroxides. Examples include, but are not limited to, dicumylperoxide ("DCP"), 2,5-dimethyl-2,5-di(t-butylperoxy)hexane, 1,1-bis(t-butylperoxy)-3,3,5-trimethyl-cyclohexane, 1,1-di-(t-butylperoxy)-cyclohexane, 2,2'-bis(t-butylperoxy) diisopropylbenzene, α, α-bis(tert-butylperoxy) diisopropyl benzene, 4,4'-bis(t-butylperoxy)butylvalerate, t-butylperbenzoate, t-butylperterephthalate, t-butyl peroxide, benzoyl peroxide, cumene hydroperoxide, t-butyl peroctoate, methyl ethyl ketone peroxide, lauryl peroxide, and tert-butyl peracetate. Also, diaryl peroxides, ketone peroxides, peroxydicarbonates, peroxyesters, dialkyl peroxides, hydroperoxides, peroxyketals and mixtures thereof may be used. The amount of organic peroxide is more than, or equal to, 0.1 parts by weight, or 0.5 parts by weight, or 0.8 parts by weight and less than, or equal to, 5 parts by weight, or 4 parts by weight, or 3 parts by weight based on 100 parts by weight of the first polymer.

The addition of the coagent may enhance the effectiveness of the cross-linking. Suitable coagents include di- and tri-allyl cyanurates and isocyanurates, liquid and metallic multifunctional acrylates and methacrylates, zinc-based dimethacrylates and diacrylates, and functionalized polybutadiene resins. The amount of organic peroxide is more than, or equal to, 0.1 parts by weight, 0.5 parts by weight, or 1 parts by weight and less than, or equal to, 10 parts by weight, 8 parts by weight, or 5 parts by weight based on 100 parts by weight of the first polymer.

Third Polymer

In other embodiments, this disclosure relates a thermoplastic blend composition comprising (i) the polymer composition of this disclosure in an amount of from great than 2 wt % to less than or equal to 40 wt % of the blend composition; and (ii) a third polymer present in an amount of from greater than or equal to 60 wt % to less than 98 wt % based on the total weight of the blend composition, wherein the third polymer includes a polypropylene having a melting point ("Tm") greater than or equal to 110° C., as determined by DSC.

The third polymer may be at least one of a propylene homopolymer or propylene copolymer. In embodiments where the additional polymer includes a propylene copolymer, and the propylene copolymer may be a graft copolymer, block copolymer, or random copolymer.

The amount of third polymer combined into the thermoplastic blend composition is up to 98 wt %, 95 wt %, 90 wt %, or 85 wt % and not less than 58 wt %, not less than 60 wt %, not less than 65 wt %, or not less than 70 wt % based on the weight of the thermoplastic blend composition.

The third polymer includes a polypropylene having a melting point ("Tm") greater than or equal to 110° C., greater than or equal to 115° C., or greater than or equal to 130° C., and a heat of fusion, as determined by DSC, of at least 60 J/g, or at least 70 J/g, or at least 80 J/g.

The amount of propylene-derived units present in the third polymer may be at least about 90 wt %, at least about 92 wt %, at least about 95 wt %, at least about 97 wt %, or about 100 wt %, based on the total weight of the third polymer.

In some embodiments, the third polymer includes a random copolymer of propylene and at least one comonomer selected from at least one of ethylene and $C_4$-$C_{12}$ alpha-olefins. In a particular aspect, the amount of comonomer has an upper limit of about 9 wt %, about 8 wt %, or about 6 wt %, and a lower limit of about 2 wt %, based on the total weight of the third polymer.

In one embodiment, the third polymer includes a copolymer of ethylene, an alpha-olefin, and a diene. The amount of ethylene-derived units in the copolymer may be 50 mol % or greater. In one embodiment, the copolymer is an ethylene-hexene copolymer. In another embodiment, the copolymer is a copolymer of ethylene, propylene, and diene known as EPDM. In a particular aspect of this embodiment, the amount of propylene-derived units in the copolymer is 40 mol % or greater.

Other Additives

As will be evident to those skilled in the art, the polymer compositions of the present disclosure may comprise other additives in addition to the first polymer and fillers as described above. Various additives may be present to enhance a specific property or may be present as a result of processing of the individual components. Additives which may be incorporated include, but are not limited to processing oils, fire retardants, antioxidants, plasticizers, vulcanizing or curative agents, vulcanizing or curative accelerators, cure retarders, processing aids, tackifying resins, flow improvers, silane coupling agent and the like. Antiblocking agents, coloring agents, lubricants, mold release agents, nucleating agents, reinforcements, and other fillers (including granular, fibrous, or powder-like) may also be employed. Nucleating agents may improve the rigidity of the article. The list described herein is not intended to be inclusive of all types of other additives which may be employed with the present disclosure. Those of skill in the art will appreciate that other additives may be employed to enhance properties of the polymer composition. As is understood by those skilled in the art, the polymer compositions of the present disclosure may be modified to adjust the characteristics of the blend as desired.

The polymer compositions described herein may contain process oil in the range of from 0 to 500 parts by weight, from 2 to 200 parts by weight, from 5 to 150 parts by weight, or from 10 to 100 parts by weight per 100 parts of first polymer. The addition of process oil in moderate amounts may lower the viscosity and flexibility of the blend while improving the properties of the blend at temperatures near and below 0° C. It is believed that these potential benefits arise by the lowering of the glass transition temperature ("Tg") of the blend. Adding process oil to the blend may also improve processability and provide a better balance of elastic and tensile strength. The process oil is typically known as extender oil in rubber applications. Process oils include hydrocarbons having either (a) traces of hetero atoms such oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils are certain organic esters and alkyl ether esters having a molecular weight ("Mn") less than 10,000. Combinations of process oils may also be used in the practice of this disclosure. The process oil should be compatible or miscible with the first polymer in the melt, and may be substantially miscible in the propylene-based elastomer at room temperature. Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference.

The addition of process aids, such as a mixture of fatty acid ester or calcium fatty acid soap bound on a mineral filler, to the polymer compositions described herein may help the mixing of the polymer composition and the injection of the polymer composition into a mold. Other examples of process aids are low molecular weight polyethylene copolymer wax and paraffin wax. The amount of process aid used may be within the range of from 0.5 to 5 parts by weight based on the total weight of the polymer composition.

Adding antioxidants to the polymer compositions described herein may improve the long term aging. Examples of antioxidants include, but are not limited to quinoline, e.g., trimethylhydroxyquinoline (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 parts by weight based on the total weight of the polymer composition.

Method of Making

The polymer compositions according to this disclosure may be compounded by any convenient method, such as dry blending of the first polymer, the filler(s) and optionally the cross-linking pack and other additives, and subsequently melt-mixing at a temperature above the melting temperature of the thermoplastic component, either directly in an extruder used to make the finished article, or by pre-melt mixing in a separate extruder (for example, a Banbury mixer). Dry blends of the polymer compositions can also be directly injection molded without pre-melt mixture. Examples of machinery capable of generating the shear and mixing include extruders with kneaders or mixing elements with one or more mixing tips or flights, extruders with one or more screws, extruders of co- or counter-rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 rpm). Typically the temperature for melt-mixing is from 60° C. to 130° C., and the residence time is from 10 to 20 minutes.

The blend may contain additives, which can be introduced into the polymer composition at the same time as the other components or later at downstream in case of using an extruder or Buss kneader or only later in time. The additives can be added to the blend in pure form or in masterbatches. The process oil or plasticizer can be added in one addition or in multiple additions. Preferably, the plasticizers are added after sufficient molten-state mixing of the polymer component and the optional one or more third polymers. Alternatively, the first polymer and the cross-linking pack, if present, may be blended prior to the incorporation of the filler. The blend can either be a physical blend or an in-reactor blend manufactured by in-reactor processes as known to those of ordinary skill in the art. The polymer compositions can be processed to fabricate articles by any suitable means known in the art. For example, the polymer compositions can be processed to films or sheets or to one or more layers of a multi-layered structure by known processes, such as calendering, casting or co-extrusion. Injection molded, compression molded, extruded or blow molded parts can also be prepared from the polymer compositions of the present disclosure. Typically the temperature for molding is higher than that for melt-mixing, and is preferably from 60 to 130° C., and the residence time is preferably 3 to 42 minutes. Alternatively, the polymer compositions can be processed by profile extrusion processes to make articles, such as wire and cable, magnetic strip, pipe and tubing, gaskets, molded articles, carpet backing, containers and floorings. The extrudate can also be milled, chopped, granulated or pelletized.

The polymer compositions of this disclosure are also useful in the preparation of masterbatches. For example, the addition of pigment or color concentrates to a polymer is often through the use of a masterbatch. In this example, a first polymer is highly filled with the filler/pigment or concentrate to form a masterbatch. Then the masterbatch is added to a third polymer to be colored. The compositions of this disclosure can contain more pigment or colorant than conventional compositions.

Applications

This disclosure encompasses a roofing material, wire and cable insulation or jackets, magnetic strip, carpet backing, container, film, sheet, filament or sound deadening materials, produced using the polymer compositions or thermoplastic blend compositions. Methods of their manufacturing are commonly known in the art and can be found, for example, in U.S. Pat. No. 4,241,123. Non-limiting specific examples will be illustrated in the below.

This disclosure will be described in more detail herein below by reference to the examples. The examples are not to be construed to limit the scope of the invention.

EXAMPLES

Materials and Methods

CaCO$_3$ is commercially available from OMYA Company as OMYA 5 T having a mean particle size of 5.0 µm.

Vistamaxx™8380 is a commercially available first polymer from ExxonMobil Chemical Company having an ethylene content of 12 wt %, a viscosity at 190° C. of 7570 cP, a melting temperature of 100° C., and a MFR (230° C., 2.16 kg) of greater than 1,000 g/10 min.

Vistamaxx™8780 is a commercially available first polymer from ExxonMobil Chemical Company having an ethylene content of 12 wt %, a viscosity at 190° C. of 3980 cP, a melting temperature of 96° C., and a MFR (230° C., 2.16 kg) of greater than 1,000 g/10 min.

under the same force. Tear strength of all samples were similar, with no specific trend shown. The hardness test results follow similar trends as the tear strength test results. For both Vistamaxx grades tested in the examples of the invention, the higher the filler content in the compound, the higher temperature (softening) was needed to soften the material.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention.

TABLE 1

| Sample | Composition | MFR (g/10 min) | Density (g/cm$^3$) | Tensile Strength at Break (MPa) | Elongation at Break (%) | Flex Modulus (MPa) | Tear Strength (kN/m) | Softening (° C.) | Shore Hardness D |
|---|---|---|---|---|---|---|---|---|---|
| 1 | 70 wt % CaCO$_3$/ 30 wt % Vistamaxx 8380 | 350.0 | 1.7 | 2.4 | 16.0 | 66.0 | 15.0 | 41.2 | 25.3 |
| 2 | 75 wt % CaCO$_3$/ 25 wt % Vistamaxx 8380 | 114.0 | 1.8 | 2.1 | 9.0 | 103.5 | 16.9 | 41.0 | 29.6 |
| 3 | 80 wt % CaCO$_3$/ 20 wt % Vistamaxx 8380 | 0.2 | 1.9 | 3.2 | 5.7 | 169.2 | 13.1 | 45.1 | 33.2 |
| 4 | 70 wt % CaCO$_3$/ 30 wt % Vistamaxx 8780 | 788.5 | 1.7 | 1.9 | 10.6 | 75.2 | 11.8 | 36.1 | 22.1 |
| 5 | 75 wt % CaCO$_3$/ 25 wt % Vistamaxx 8780 | 241.0 | 1.8 | 2.4 | 7.0 | 104.3 | 13.5 | 38.2 | — |
| 6 | 80 wt % CaCO$_3$/ 20 wt % Vistamaxx 8780 | 4.8 | 1.8 | 2.2 | 7.5 | 108.8 | 14.2 | 40.4 | 28.5 |

Some test methods used in the examples are shown as follows.

Test Methods

| Parameter | Test Method | Speed/ Conditions | Specimen Size |
|---|---|---|---|
| Hardness | ASTM D2240 | 15 s delay | Disk 2 mm/50 mm (thickness/diameter) |
| Tensile Strength | ASTM D638 | 500 mm/min | Type 3 dumb bell 2 mm ISO plaque |
| Elongation@break | ASTM D638 | | |
| Flexural Modulus | ASTM D790 | | |
| Tear Strength | ASTM D192206a | | |
| Vicat Softening | ASTMD1525 | | |

Filler masterbatch samples were prepared using a twin-screw extruder and blending varying amounts of CaCO$_3$ with varying amounts Vistamaxx™8380/8780, as listed in the table below. Blend properties were measured and are also reported.

The results in Table 1 show that the density of the high filler load compound increases with the increasing filler content. No specific trend in tensile strength of the compound is shown. Samples 1-3 with Vistamaxx™8380 show good elongation values, especially at 70 wt % filler loading (Sample 1). When the filler content decreases by as little as 5 wt %, the elongation of the compound decreases substantially. For all samples, elongation was favorably higher with lower filler content (i.e., higher first polymer content). The flex modulus (ratio of stress to strain) of each of the samples increased with higher filler content in the compound. The higher the flex modulus value, the lower the material bends

What is claimed is:

1. A polymer composition comprising:
a) a blend comprising (a) a first propylene-based polymer, wherein the first propylene-based polymer is a copolymer of greater than 50 mol % propylene and ethylene or a C4 to C10 alpha-olefin; and (b) a second propylene-based polymer, wherein the second propylene-based polymer is a copolymer of greater than 89 mol % propylene and ethylene or a C4 to C10 alpha-olefin; wherein the second propylene-based polymer is different than the first propylene-based polymer; wherein the blend has a melt viscosity of about 3,000 cP to about 10,000 cP, a melting point, as determined by DSC, of about 130° C. or less, a melt flow rate greater than about 2,000 g/10 min measured at 230° C. and 2.16 kg weight, and a comonomer content of from 6 mol % to about 18 mol % ethylene and/or a C4 to C10 alpha-olefin;
b) one or more fillers comprising:
i) carbon black, in an amount of from greater than 40 wt % to less than or equal to 65 wt % based on the total weight of said polymer composition; or
ii) ferrite magnet powder, in an amount of from greater than 40 wt % to less than or equal to 90 wt % based on the total weight of said polymer composition; or
iii) calcium carbonate, in an amount of from greater than 75 wt % to less than or equal to 90 wt % based on the total weight of said polymer composition; or
iv) alumina trihydrate, magnesium hydroxide, talc, titanium dioxide, natural fibers, polymeric fibers, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, mica, wollastonite, chalk, graphite, pigments, or any combination thereof, in an amount of from greater than 40 wt % to less than or equal to 90 wt % based on the total weight of said polymer composition; and optionally c) a cross-linking pack comprising a cross-linking agent in an amount of from 0.1 to 5 parts by weight and a coagent in an amount of from 0.05 to 10 parts by weight, based on 100 parts by weight of said first polymer, and wherein said cross-linking agent comprises an organic peroxide and said coagent comprises at least one of di- and tri-allyl cyanurates and isocyanurates, liquid and metallic multifunctional acrylates and methacrylates, zinc-based dimethacrylates and diacrylates, and functionalized polybutadiene resins.

2. The composition of claim 1, wherein said one or more fillers comprise:
  i) carbon black, in an amount of from greater than 50 wt % to less than or equal to 60 wt % based on the total weight of the polymer composition; or
  ii) ferrite magnet powder, in an amount of from greater than 40 wt % to less than or equal to 90 wt % based on the total weight of the polymer composition; or
  iii) calcium carbonate, in an amount of from greater than 82 wt % to less than or equal to 84 wt % based on the total weight of the polymer composition; or
  iv) alumina trihydrate, magnesium hydroxide, or titanium dioxide, in an amount of from greater than 60% to less than or equal to 78 wt % based on the total weight of the polymer composition.

3. The composition of claim 1, wherein the composition comprises the cross-linking pack.

4. The composition of claim 3, wherein the organic peroxide comprises at least one of dicumylperoxide ("DCP"); 2,5-dimethyl-2,5-di(t-butylperoxy)hexane; 1,1-bis(t-butylperoxy)-3,3,5-trimethyl-cyclohexane; 1,1-di-(t-butylperoxy)-cyclohexane; 2,2'-bis(t-butylperoxy) diisopropylbenzene; 4,4'-bis(t-butylperoxy)butylvalerate; t-butyl-perbenzoate; t-butylperterephthalate; t-butyl peroxide; benzoyl peroxide; cumene hydroperoxide; t-butyl peroctoate; methyl ethyl ketone peroxide; lauryl peroxide; and tert-butyl peracetate.

5. The composition of claim 1, wherein the second propylene-based polymer is a copolymer of at least 90 mol % propylene to 95 mol % propylene.

6. The composition of claim 1, wherein the second propylene-based polymer has a percentage of isotactic triads, as measured by $^{13}$C NMR, of 75 mol % to 99 mol %.

7. The composition of claim 1, wherein the second propylene-based polymer has a tacticity index (m/r), as measured by $^{13}$CNMR of 4 to 25.

8. The composition of claim 1, wherein the second propylene-based polymer has a weight average molecular weight of greater than 200,000 to 500,000.

9. The composition of claim 1, wherein the second propylene-based polymer has a weight average molecular weight of 300,000 to 500,000.

10. The composition of claim 1, wherein the second propylene-based polymer has a weight average molecular weight of 5,000 to 10,000.

11. The composition of claim 1, wherein the second propylene-based polymer has a density of 0.85 g/cm$^3$ to 0.89 g/cm$^3$.

12. The composition of claim 1, wherein the second propylene-based polymer has a density of 0.89 g/cm$^3$ to 0.92 g/cm$^3$.

13. The composition of claim 1, wherein: the second propylene-based polymer is a copolymer of at least 90 mol % propylene to 95 mol % propylene and has a percentage of isotactic triads, as measured by $^{13}$C NMR, of about 75 mol % to about 99 mol %, a tacticity index (m/r), as measured by $^{13}$CNMR of about 4 to about 25, a weight average molecular weight of greater than 200,000 to 500,000, and a density of 0.89 g/cm$^3$ to 0.92 g/cm$^3$.

14. A thermoplastic blend comprising:
  the composition of claim 2, in an amount of from greater than 2 wt % to less than or equal to 40 wt % of the thermoplastic blend composition; and
  a third polymer present in an amount of from greater than or equal to 60 wt % to 98 wt % based on the total weight of the thermoplastic blend;
  wherein said third polymer includes a polypropylene having a melting point of greater than or equal to 110° C., as determined by DSC.

15. The thermoplastic blend of claim 14, wherein said third polymer is polypropylene homopolymer.

16. The thermoplastic blend of claim 14, comprising said polymer composition in an amount of from greater than 30 wt % to less than or equal to 40 wt % based on the total weight of said thermoplastic blend composition, and said third polymer in an amount of from greater than or equal to 60 wt % to less than 70 wt % based on the total weight of said thermoplastic blend composition.

17. A roofing material, wire and cable insulation or jackets, magnetic strip, carpet backing, or container, comprising the polymer composition of claim 1.

18. A roofing material, wire and cable insulation or jackets, magnetic strip, carpet backing, or container, comprising the thermoplastic blend composition of claim 14.

19. A polymer composition comprising:
  a) a blend comprising (a) a first propylene-based polymer, wherein the first propylene-based polymer is a copolymer of greater than 50 mol % propylene and ethylene or a C4 to C10 alpha-olefin; and (b) a second propylene-based polymer, wherein the second propylene-based polymer is a copolymer of greater than 89 mol % propylene and ethylene or a C4 to C10 alpha-olefin; wherein the second propylene-based polymer is different than the first propylene-based polymer;
  wherein the blend has a melt viscosity of about 3,000 cP to about 10,000 cP, a melting point, as determined by DSC, of about 130° C. or less, a melt flow rate greater than about 2,000 g/10 min measured at 230° C. and 2.16 kg weight, and a comonomer content of from 6 mol % to about 18 mol % ethylene and/or a C4 to C10 alpha-olefin;
  b) calcium carbonate, in an amount of from greater than 75 wt % to less than or equal to 84 wt % based on the total weight of the polymer composition,
  wherein the polymer composition has a melt flow rate equal to or greater than 114 g/10 min and less than 241 g/10 min measured at 230° C. and 2.16 kg weight.

* * * * *